Aug. 7, 1951     C. M. BROWNE     2,563,391
FLUX
Filed July 9, 1947

Inventor
Charles M. Browne
Nobbe & Swope
Attorneys

Patented Aug. 7, 1951

2,563,391

UNITED STATES PATENT OFFICE 2,563,391

FLUX

Charles M. Browne, Toledo, Ohio, assignor to Libbey-Owens-Ford Glass Company, Toledo, Ohio, a corporation of Ohio Application July 9, 1947, Serial No. 759,766

9 Claims. (Cl. 148—23)

The present invention relates to an improved method of uniting metals to metals, metals to glass, and glass to glass. More particularly, it has to do with a new flux composition for use in the method.

Broadly stated, the new flux material is an alkylolamine salt of an organic dicarboxylic acid having from 3 to 10 carbon atoms, and the specific material with which I have had especially good results is triethanol ammonium adipate. While in no way restricted to any particular use, this flux material is especially well adapted for employment in the soldering operations necessary to the application, and sealing, in of metal separator strips in making glass-metal, multiple panel, glazing units of the general type produced and sold by the Libbey-Owens-Ford Glass Company under the trade-mark "Thermopane."

Such structures are made up of two or more sheets of glass, or other transparent material, held in spaced face to face relation by metallic separator means which are bonded to the glass sheets around their marginal portions through the intermediary of a metallic coating or coatings on the glass, and a solder joint between these coatings and the metallic separator.

The metallic coatings which are to be used as the base coat for the soldering operations are usually sprayed onto the glass sheets with a metallizing gun. When using copper or some of its alloys, the coefficient of expansion of which differs considerably from that of glass, for this purpose, it is necessary to limit the metallizing of the glass to relatively thin coats of the metal. If this is not done, the metal, on cooling from the relatively high temperature of the metallizing operation, tends to strip off the glass taking with it a thin scale of the glass.

On the other hand, when a sufficiently thin coat of such metal is sprayed upon the glass to avoid the above difficulty, then, although there may be ample metal for the necessary strength of construction, the surface density of the metal on the glass is so small that if a strong flux is used in tinning preliminary to further soldering operations, corrosion of the metal against the glass is very apt to set in and after a few months or years, depending on conditions of use, the body of metal to glass will be destroyed and the construction will fail.

It is an object of this invention to provide a novel method of producing all glass and metal, multiple panel, glazing units of the above character which includes the step of preparing the surfaces of the metal coatings on the glass sheets and/or surfaces of the metallic separator by treating these surfaces, preparatory to soldering, with a special flux.

Another object is the provision of a new composition of matter that is particularly adapted to be used as a flux for this purpose, and which will minimize, if not entirely eliminate, the tendency toward corrosion of the metal against the glass.

Another object is to provide a new fluxing agent which is non-volatile, non-corrosive, non-hygroscopic and which will exert an active fluxing action at relatively low temperatures.

Still another object is the provision of a method of producing a glass to metal joint in an all glass-metal, multiple panel, glazing unit which includes introducing a layer of solder between a metal coating on the glass and the metal separator, pressing the glass and separator together and then heating the assembly to a temperature at which the solder will melt and flow; and which includes the use of triethanol ammonium adipate as the flux in the soldering operation.

Other objects and advantages of the invention will become more apparent during the course of the following description, when taken in connection with the accompanying drawings.

In the drawings, wherein like numerals are employed to designate like parts throughout the same:

The special fluxes of this invention can be used advantageously in connection with any type of soldering operation and with all of the known methods of making all glass and metal multiple panel glazing units; for example, that disclosed in the patent to Charles D. Haven et al., 2,235,681, granted March 18, 1941. However, they have characteristics that are especially advantageous for use in the particular method disclosed in the copending application of George B. Watkins, Serial No. 728,071, filed February 12, 1947, and will be described in that connection here.

Figure 1:
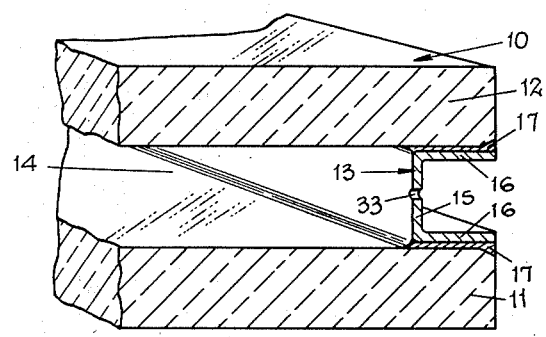
Fig. 1 is a fragmentary sectional view through one edge of a multiple glass sheet glazing unit produced in accordance with this invention.

Referring now more particularly to the drawings, there has been illustrated in Fig. 1 a preferred form of unit according to the invention, and which is designated in its entirety by the numeral 10. It will be readily appreciated that two or more sheets of glass can be fabricated into a glazing unit of this character, giving one or more spaces between adjacent glass sheets as occasion may require. For example, in ordinary buildings, a two sheet unit is satisfactory, while in refrigerators and such places it is desirable as a rule to make use of three or more sheet constructions. It will thus be understood that our invention is in no way confined to the exact number of glass sheets used or spaces between the sheets.

The unit 10 is made up of two sheets of glass 11 and 12 held in spaced parallel relationship to one another by a separator 13 extending entirely around the margins of the unit and providing an enclosed air space 14 within the unit. The separator 13 is, in this case, preferably channel-shape in cross section, being provided with a spacing web portion 15 and flanges 16 which are permanently bonded to the contiguous glass sheets by a glass to metal seal, designated in its entirety by the numeral 17 and which is hereinafter to be more fully described.

In view of the fact that the inner surfaces of the glass sheets cannot be cleaned after the unit is made and installed, it is preferable to use glass which is stable when in use. Likewise, before the unit is completed, the inner surfaces of the glass sheets should be thoroughly cleaned not only for sake of appearance and permanency of unit, but also to facilitate application of the metal coatings upon the glass in a manner to get permanent and adequate adhesion or bond between the glass and metal.

The separator strip 13 is preferably of lead, of a thickness between 1/32 and 1/64 of an inch, and should be cast or otherwise preformed into a rectangular frame designed to fit between the two glass sheets and with its flanged portions 16 covering the inner marginal portions of the sheets. The use of a preformed flanged separator strip is partially responsible for the ease and speed with which this particular type of improved glazing unit can be fabricated and has the additional advantage of providing a relatively wide bonding area between the glass and separator means.

Figure 2:
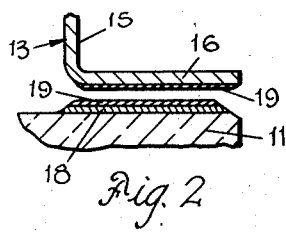
Fig. 2 is a fragmentary sectional view through the metal coated marginal edge of a glass sheet and through a portion of the separator strip after they have been tinned and just prior to assembly.

The glass to metal bond 17 is made up of a metallic coating on the glass sheets, and a solder joint between these coatings and the flanges 16 of the separator strip. This is best illustrated in Fig. 2. As shown there, there is provided a thin but tightly adhering coating of metal 18 all around the marginal portion of the glass sheet 11, of a width substantially the same as the width of the flange 16. Various metals can be used for the purpose and may be applied in any suitable manner. However, the best results to date have been had with a copper-titanium-chrome alloy sprayed onto the glass in the manner described in the Haven et al. Patent 2,235,681.

The next step in producing the units is to tin both the metallized marginal portions of the glass sheets and the flanges 16 of the separator strip by applying a layer of solder 19 to each. This too can be done in any of the generally accepted ways in which metal is tinned and we use a special type of low melting point solder for our heat and pressure method of compositing. One very good solder is made up of 40 parts of lead, 40 parts of bismuth and 20 parts of tin. This solder has a melting point of around 111° centigrade.

As a matter of precaution and to insure the utmost of cleanliness, a flux is also preferably used. Indeed, this is considered highly essential in obtaining a permanent, satisfactory union between the solder layers and the metal coating on the glass. Almost any active flux will aid in the production of a continuous solder joint. However, in the heat and pressure compositing method shown, the flux, to be satisfactory, must have some special properties.

For example, such a flux must:
(1) Exert an active fluxing action at relatively low temperatures (around 150° centigrade);
(2) Contain no volatile components which will distill out during the heating and condense on the inner glass surfaces of the unit;
(3) Be non-corrosive; and
(4) Be non-hygroscopic.

As pointed out above, the special fluxes of this invention are, broadly stated, alkylolamine salts of a carboxylic acid having from 3 to 10 carbon atoms and especially good results have been obtained with the triethanolamine salts of dicarboxylic acids having from 3 to 10 carbon atoms.

For example, triethanol ammonium adipate, triethanol ammonium succinate, monoethanolamine adipate and monoethanolamine succinate were used with notable results. Triethanol ammonium azelate, triethanol ammonium sebacate and triethanol ammonium adipate show considerable promise; and it is believed that triethanol ammonium suberate and triethanol ammonium pimelate would be suitable, but these materials are not commercially available.

However, the outstanding performance was given by my new composition, triethanol ammonium adipate. This newly discovered flux gives unusually excellent results in the particular method described above. It is waxy in appearance and can be prepared by heating a mixture of 30 grams of triethanolamine and 18 grams of adipic acid, until a homogeneous solution is obtained, and then permitting the liquid to cool and solidify.

In using the material as a flux it can be applied in a number of different ways and either as a solid or a solution. For example, it can be applied in the concentrated or solid form by smearing it on a surface with a cloth, or by application with a stiff bristle brush to the parts to be soldered. Another way of applying the flux in solid form is to mix it with a material such as Carnauba wax. This gives an easily applied flux that works very satisfactorily.

However, in making all glass and metal glazing units it is usually preferred to employ a solution of the triethanol ammonium adipate. This can be produced by diluting the material with a solvent such as isopropyl alcohol and applying the solution in any desired manner. A relatively dilute solution appears to be most satisfactory and good results have been obtained with a solution of as little as 2% of triethanol ammonium adipate in the solvent. A preferred range is from 2% to 10%.

Figure 5:
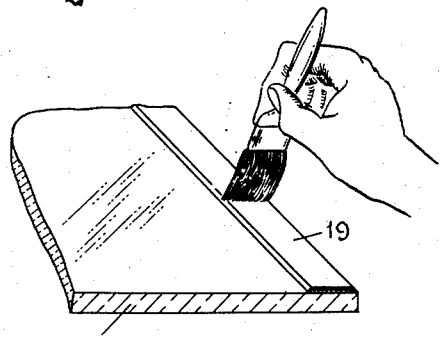
Fig. 5 is a fragmentary view of a portion of the tinned metallized marginal portions of the glass sheet of Fig. 2, showing the step of applying the flux of this invention.

The solution is applied to the tinned surfaces 19, 19 of both the channel and the metallized glass by means of a paint brush or other suitable applicator as indicated in Fig. 5.

To avoid electrolytic action or other undesirable reactions between the component parts of the construction, care should be exercised in selecting the materials to be used as the coatings on the glass, the separator strips, and the bonding means for joining the separator strip to the metallized coatings on the glass. Likewise, the metallized coatings on the glass should exhibit permanent adherence not only toward the other metallic components but also toward the glass sheets themselves. When using the copper alloy for the metallized coatings, lead compositions as mentioned above for the separator strips, and solder and flux compositions as indicated, a thoroughly satisfactory unit is produced.

After the metallized coating on the glass sheets and the flanges of the separator strip have been properly tinned and fluxed, the several parts of the unit are assembled together to form a complete structure as shown in Fig. 1. When the flux is applied as a solution, the solvent is allowed to evaporate before assembling the structure.

Figure 4:
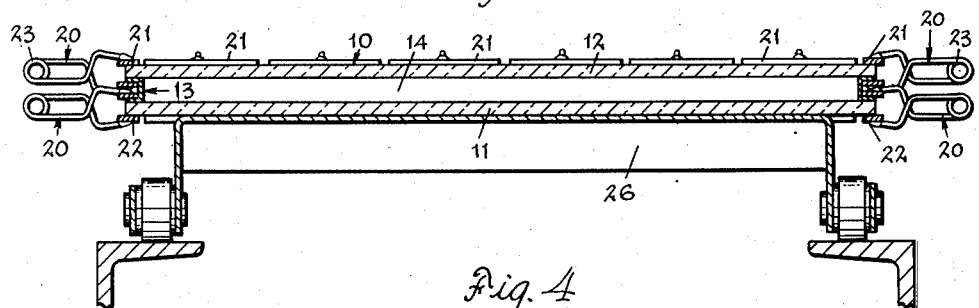
Fig. 4 is a section through a glazing unit and a part of the conveyor, taken substantially along line 3—3 in Fig. 3, and showing the pressing means in position.

The next step is to apply pressure to urge the portions to be bonded into intimate contact with each other and this can be done by the use of suitable spring clamps 20 (Fig. 4).

Each of these clamps includes a pair of jaws 21 and 22, with the opposite ends of looped spring members 23 being secured, one to each jaw, and acting to urge the jaws toward one another. The jaws 21 and 22 themselves are preferably made relatively short so that a plurality of the clamps 20 can be placed closely side by side along all four sides of the unit (Fig. 4). Alternatively, spring clamps having jaws that are sufficiently elongated to extend over the marginal portions along one whole side of the unit may be used. In this case only four clamps would be necessary, one for each side of the assembled structure.

In lieu of the single spring member 23, two or more spring members may be used with each pair of jaws whenever necessary to obtain the required amount of pressure, or to equalize the pressure throughout the length of the opposed clamping jaws.

By proper use of the clamps 20 in the manner shown, both flanges 16 of the separator strip 13 will be pressed against the metallized coating on the adjacent glass sheet all along and around the four sides of the unit. The amount of pressure used may vary with the different conditions of heat, length of heating cycle and so forth, but we have found a pressure of approximately five pounds per linear inch to give good results under normal operating conditions.

After the units have been assembled and the flanges of the separator clamped against the contiguous glass sheets, the clamped structure is ready to be heated under pressure to a temperature at which the solder will flow and sweat the soldered metallized coating to the soldered flange of the separator. One way in which this can be done is by passing the entire assembled and clamped unit through a tunnel type furnace 25 such as is shown in Fig. 3.

For this purpose the assemblies are placed on an endless conveyor 26, driven by a suitable drive means 27, and upon which the assembled units are carried into and through the tunnel furnace 25. The furnace may be heated by any suitable means, for example with the glo bars 28, and may be divided into suitable zones to facilitate heat control and permit the establishment of progressively increased and/or decreasing temperatures from one end to the other.

Thus, in some instances it is desirable to heat the assembled units slowly up to the point where the solder will flow sufficiently to provide the desired sweat job, and to then slowly cool the assemblies down to near room temperature. This procedure has the advantage of preheating the glass and other parts of the unit before the soldering operation takes place, and then gradually cooling or, in effect, annealing the soldered unit to complete the job.

Figure 3:
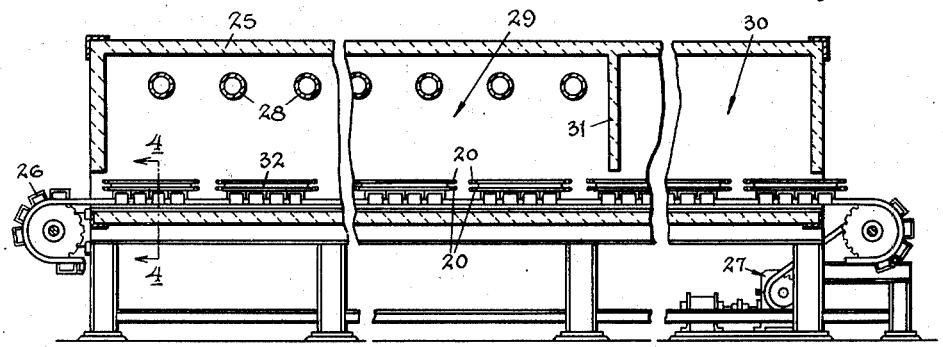
Fig. 3 is a longitudinal sectional view through an oven in which the compositing operation is carried out.

As a practical example, the furnace of Fig. 3 may be divided into a heating zone 29 and a cooling zone 30 by a suitable baffle wall 31. Using the special solder and flux described above, a temperature within the heating zone of approximately 150° centigrade has proved very satisfactory. The units 32 are passed end to end through the furnace and, if the conveyor 26 is timed to carry a unit through the heating zone in approximately five minutes, it will be found that the unit will have heated in that time to a point where the solder will flow under the pressure applied, and a good tight sweat joint will be obtained. The clamped unit is then carried into and through the cooling zone 30 so that by the time it reaches the end of the furnace the solder will have hardened sufficiently to permit the clamps to be removed.

Prior to introducing the units into the furnace, it is desirable to puncture the separator strip 13 at two spaced points, preferably at opposite sides of the unit, as shown at 33, in order to prevent collapse of the unit or excessive strain on the joint during alternate heating and cooling. When the soldered unit emerges from the furnace and the clamps are removed, the punctured holes 33 can be used to dehydrate the air space and to fill it with dehydrated air or gas at, above or below atmospheric pressure in the manner disclosed in the Haven et al. Patent 2,235,681 already referred to. When this has been done the unit is ready for use, although the edge of the unit can be coated with any suitable weather-proofing material to give additional protection or to improve its appearance when desired.

The compositing method described above will result in a sweating together and joining of the preformed separator strip and the prepared coatings on the glass to produce an air-tight and moisture-proof space between the glass sheets. This has heretofore proved to be a very difficult thing to do, and tests have shown that the separator strips and metallized coatings on the glass are subjected to amazingly high degrees of strain and stresses, so that a joint which visually appears to be perfectly satisfactory will break down when the units are subjected to normal use under adverse conditions.

It is to be understood that the forms of the invention herewith shown and described are to be taken as illustrative embodiments only of the same, and that various changes may be resorted to without departing from the spirit of the invention or the scope of the subjoined claims.

I claim:

1. A flux comprising essentially a non-volatile, non-corrosive, non-hygroscopic ethanolamine salt of a saturated aliphatic dicarboxylic acid having from 3 to 10 carbon atoms which has an active fluxing action at relatively low temperatures, and a low boiling point solvent therefor.

2. A flux consisting essentially of a non-volatile, non-corrosive, non-hygroscopic triethanolamine salt of a saturated aliphatic dicarboxylic acid having from 3 to 10 carbon atoms which has an active fluxing action at temperatures around 150° centigrade, diluted with a solid, inert, non-volatile, carrying material miscible with triethanol ammonium adipate and fusible under soldering conditions.

3. A flux consisting essentially of triethanol ammonium adipate and a carrier therefor.

4. A liquid flux consisting essentially of triethanol ammonium adipate and a low boiling point solvent therefor.

5. A flux consisting essentially of triethanol ammonium adipate and a solid inert, non-volatile, carrying material miscible with triethanol ammonium adipate and fusible under soldering conditions mixed therewith.

6. A flux consisting essentially of triethanol ammonium succinate and a carrier therefor.

7. A flux consisting essentially of monoethanolamine adipate and a carrier therefor.

8. A flux consisting essentially of monoethanolamine succinate and a carrier therefor.

9. A flux consisting essentially of triethanol ammonium sebacate and a carrier therefor.

CHARLES M. BROWNE.

REFERENCES CITED

The following references are of record in the file of this patent:

UNITED STATES PATENTS

| Number | Name | Date |
|---|---|---|
| 2,067,219 | Whitehead | Jan. 12, 1937 |
| 2,094,608 | Kritchersky | Oct. 5, 1937 |
| 2,095,335 | Kofke | Oct. 12, 1937 |
| 2,130,947 | Carothers | Sept. 20, 1938 |
| 2,198,578 | Hazelton | Apr. 23, 1940 |
| 2,200,184 | Morgan | May 7, 1940 |
| 2,228,352 | Hopfield | Jan. 14, 1941 |
| 2,235,680 | Haven | Mar. 18, 1941 |
| 2,263,166 | Darvie | Nov. 18, 1941 |